(12) United States Patent
Johannessen

(10) Patent No.: US 12,019,321 B2
(45) Date of Patent: Jun. 25, 2024

(54) SYSTEM, METHOD, AND APPARATUS FOR CUSTOMIZING PHYSICAL CHARACTERISTICS OF A SHARED SPACE

(71) Applicant: B/E AEROSPACE, INC., Winston Salem, NC (US)

(72) Inventor: Eric Johannessen, Holbrook, NY (US)

(73) Assignee: B/E AEROSPACE, INC., Winston Salem, NC (US)

( * ) Notice: Subject to any disclaimer, the term of this patent is extended or adjusted under 35 U.S.C. 154(b) by 100 days.

(21) Appl. No.: 17/747,374

(22) Filed: May 18, 2022

(65) Prior Publication Data
US 2023/0375866 A1    Nov. 23, 2023

(51) Int. Cl.
| | |
|---|---|
| G02F 1/133 | (2006.01) |
| B60Q 3/43 | (2017.01) |
| B60Q 3/47 | (2017.01) |
| B64D 11/00 | (2006.01) |

(Continued)

(52) U.S. Cl.
CPC ........... *G02F 1/13306* (2013.01); *B60Q 3/43* (2017.02); *B60Q 3/47* (2017.02); *B64D 11/0015* (2013.01); *G09G 3/3406* (2013.01); *G09G 5/12* (2013.01); *G09G 2370/16* (2013.01); *G09G 2380/12* (2013.01)

(58) Field of Classification Search
CPC .......... G09G 5/006; G09G 5/18; G09G 5/363; G09G 5/12; G09G 2310/04; G09G 2360/04; G09G 2340/0435; G09G 2310/08; G09G 2330/021; G09G 2340/14; G06F 3/1423; G06F 1/06
See application file for complete search history.

(56) References Cited

U.S. PATENT DOCUMENTS

| | | |
|---|---|---|
| 9,625,716 B2 | 4/2017 | Wischmeyer |
| 10,931,938 B2 | 2/2021 | Hulsey et al. |
| 2011/0043881 A1 | 2/2011 | Elferich |

(Continued)

FOREIGN PATENT DOCUMENTS

EP    3046397    7/2016

OTHER PUBLICATIONS

European Patent Office, European Search Report dated Oct. 20, 2023 in Application No. 23173914.5.

*Primary Examiner* — Shaheda A Abdin
(74) *Attorney, Agent, or Firm* — SNELL & WILMER L.L.P.

(57) ABSTRACT

A system controller may provide a shared clock source to multiple illumination peripherals and multiple wearable vision obstruction devices having shutters. The multiple illumination peripherals may selectably turn on and off during different timeslots and the shutters of the multiple wearable vision obstruction devices may selectably occlude and un-occlude vision of users during the different time slots. By modulating the illumination peripherals and the shutters, different users may perceiver different sensory inputs in a shared environment. For instance, users may experience brighter or dimmer illumination, or may experience different types of illumination. One user may view a movie on an LCD screen while the LCD screen appears blank to another user. In this manner, a passenger cabin of an aircraft may provide individualized sensory experiences to different passengers sharing the aircraft cabin.

20 Claims, 6 Drawing Sheets

(51) Int. Cl.
*G09G 3/34* (2006.01)
*G09G 5/12* (2006.01)

(56) References Cited

U.S. PATENT DOCUMENTS

| | | |
|---|---|---|
| 2011/0149053 A1 | 6/2011 | Ito et al. |
| 2011/0243325 A1* | 10/2011 | Ishii ........................ G09G 3/20 |
| | | 345/589 |
| 2015/0077516 A1 | 3/2015 | Coto-Lopez |
| 2016/0025978 A1* | 1/2016 | Mallinson .......... G02B 27/0172 |
| | | 345/8 |
| 2016/0275908 A1* | 9/2016 | Kim ....................... G09G 5/006 |
| 2018/0276891 A1* | 9/2018 | Craner ..................... G08B 7/06 |
| 2019/0187883 A1* | 6/2019 | Lee ........................ B60K 35/28 |

* cited by examiner

SYSTEM, METHOD, AND APPARATUS FOR CUSTOMIZING PHYSICAL CHARACTERISTICS OF A SHARED SPACE

FIELD

The present disclosure relates generally to a system, method, and apparatus for customizing physical characteristics of a shared space and more particularly, to a system, method, and apparatus for facilitating different sensory perceptions of the physical characteristics for different people sharing a physical space.

BACKGROUND

Various shared spaces may have multiple people occupying a shared space with a common set of physical characteristics. For instance, lights, or electronic display screens, or off-axis surface illumination may be operative in a space. Customization of the physical characteristics is limited, and the physical characteristics may be inconsistent with desirable changes to the characteristics to facilitate different uses of the space by different individuals simultaneously. For instance, illumination may need to be brighter for some activities such as reading and may need to be dimmer for other activities such as sleeping. Videos and images may be desired to be displayed to some individuals and hidden from other individuals. Thus, there remains a need for an electronic system to alter and customize individual perceptions of physical characteristics of the shared space.

SUMMARY

A sensory input control system is provided. The system includes a system controller, a first illumination peripheral, a second illumination peripheral and a first wearable vision obstruction device. The system controller includes a clock source to provide a shared clock defining a first periodic duration of time and a second periodic duration of time. The first illumination peripheral is configured to receive the shared clock and includes a first illumination device providing a first light to a shared space during at least a portion of the first periodic duration of time. The second illumination peripheral is configured to receive the shared clock and includes a second illumination device providing a second light to the shared space during at least a portion of the second periodic duration of time. The first wearable vision obstruction device is configured to receive the shared clock and has a first shutter to selectably occlude a first field of view during at least a portion of the first periodic duration of time and to selectably un-occlude the first field of view during at least a portion the second periodic duration of time, so that the first user perceives the second light and does not perceive at least a portion of the first light.

The sensory input control system may include one or more additional feature as well. For instance, the system may have a second wearable vision obstruction device. The second wearable vision obstruction device may be configured to receive the shared clock and may include a second shutter to selectably occlude a second field of view during the second periodic duration of time and to selectably un-occlude the field of view during the first periodic duration of time, so that the second user perceives only the first light and not the second light.

In various embodiments, the shared space is an aircraft passenger cabin. In various embodiments, the first illumination device is an LCD screen configured to play videos and the second illumination device is an overhead cabin light. The first shutter further may selectably occludes the field of view during a further portion of the second periodic duration of time so that the user perceives only a portion of the second light. The system controller may have a wireless transceiver transmitting the shared clock and the first illumination peripheral may have a wireless transceiver to receive the shared clock. The first wearable vision obstruction device may be wireless smart glasses. The shutter of the first wearable vision obstruction device may be an LCD shutter. The shared clock may be a 60 Hz clock and the first periodic duration of time may be a timeslot of $\frac{1}{10}^{th}$ of a single 60 Hz clock cycle.

A further sensory input control system is provided. The system may include a system controller and a transceiver. The system controller may include a clock source to provide a shared clock defining a first periodic duration of time and a second periodic duration of time. The system may include a transceiver configured to receive the shared clock and configured to direct an overhead light of an aircraft passenger cabin to turn on to provide a first light to the aircraft passenger cabin during at least a portion of the first periodic duration of time and to turn off to not provide the first light to the aircraft passenger cabin during at least a portion of the second periodic duration of time. In various embodiments the system controller is further configured to provide the shared clock to a first wearable vision obstruction device worn by a passenger to selectably occlude the passenger's vision during at least a portion of the first periodic duration of time during which the overhead light is providing the first light to the aircraft passenger cabin.

The system may include further aspects. For instance, the transceiver may be configured to direct a backlight of a seatback video screen of the aircraft passenger cabin to turn off during at least a portion of the first periodic duration of time and to turn on during at least a portion of the second periodic duration of time so that the passenger does not perceive a video on the seatback video screen. The system may include the first wearable vision obstruction device with the first wearable vision obstruction device being a smart glasses with an LCD shutter.

A method of sensory input control is provided. The method may include a variety of aspects that may be performed in sequence or parallel. The method may include providing, by a system controller and a clock source, a shared clock defining a first periodic duration of time and a second periodic duration of time. The method may include receiving, by a first illumination peripheral having a first illumination device, the shared clock. The method may include providing, by the first illumination device, a first light to a shared space during at least a portion of the first periodic duration of time. In various embodiments, the method also includes receiving, by a second illumination peripheral having a second illumination device, the shared clock and providing, by the second illumination device, a second light to the shared space during at least a portion of the second periodic duration of time. The first wearable vision obstruction device having a first shutter, may receive the shared clock and the first shutter may selectably occlude a first field of view during at least a portion of the first periodic duration of time. The first shutter may also selectably un-occlude the first field of view during at least a portion the second periodic duration of time, so that the first user perceives the second light and does not perceive at least a portion of the first light.

The method may include further aspects. For instance, the method may include receiving, by a second wearable vision obstruction device having a second shutter, the shared clock and selectably occluding, by the second shutter, a second field of view during the second periodic duration of time. The method may include selectably un-occluding, by the second shutter, the second field of view during the first periodic duration of time, so that the second user perceives only the first light and not the second light.

The method may further include wherein the shared space is an aircraft passenger cabin. The first illumination device may be an LCD screen configured to play videos and the second illumination device may be an overhead cabin light. The system controller may have a wireless transceiver transmitting the shared clock and the first illumination peripheral may have a wireless transceiver to receive the shared clock. The first wearable vision obstruction device may be wireless smart glasses. The shutter of the first wearable vision obstruction device may be an LCD shutter. The shared clock may be a 60 Hz clock and the first periodic duration of time may be a timeslot of $\frac{1}{10}^{th}$ of a single 60 Hz clock cycle.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Individuals occupying a shared space may be performing different tasks. However, the physical characteristics of the shared space may be inconsistent with the performance of the different tasks. For instance, well-lit space may impede resting, whereas a dimly-lit space may interfere with reading or writing. Some occupants of the space may need to monitor electronic screens while other occupants of the space may not need to monitor the screens, or it may be advantageous to hide the screens from them. Moreover, multiple individuals may have different preferences for color, pattern, brightness, and other aspects of visual illumination within the space. For instance, a vehicle operator may need to be exposed to cyan light to promote wakefulness, or red light to preserve night vision, while a vehicle passenger may need a dark environment, for instance, to promote sleep. In various instances, these different individuals occupy a shared space.

The system, method, and apparatus provided in this disclosure facilitates unique and personalized experiences in shared spaces, where each vehicle passenger may don special glasses and experience different visual features based on preference. For instance, one passenger can select to see reading lights, exterior windows, cabin lighting, and the like, while another passenger can select to see video screens such as inflight entertainment screens, floor path lighting, etc. Moreover, different passengers may desire to turn different types of lighting on or off or adjust a relative brightness of different types of lighting. Some passengers may desire to see only one inflight entertainment screen, but not other inflight entertainment screens. Different vehicle crew members may don special glasses and experience different visual features based on different roles or modes of vehicle operation. For instance, flight crew members on an aircraft may desire to see different instruments, experience different levels of lighting, dim exterior illumination such as the sunlight passing through cockpit windows, and the like. During different modes of vehicle operation, different instrument displays may be higher or lower priority and may be emphasized or deemphasized such as by appearing brighter or darker.

The system, method, and apparatus herein implement LCD shutter based glasses that selectably open a shutter to selectably occlude a field of view (e.g., reduce light transmissivity into the field of view) or un-occlude (e.g., increase light transmissivity into the field of view). Different illumination sources may be selectably turned on and off. The opening or closing of the shutter and the turning on or off of the illumination sources may be pulse width modulated and synchronized so that different individuals perceive different illumination sources or may perceive a same illumination source at different perceived brightness levels. By selecting a modulation frequency for the illumination sources and/or for the glasses that is above the flicker fusion frequency, users will not perceive the rapid turning on and off or the rapid occluding and un-occluding but will experience different illumination sources as being in a constant on or constant off status, not perceiving the rapid switching of the different illumination sources. As used herein "flicker fusion frequency" refers to a frequency conventionally defined in the psychophysics of vision and at which an intermittent light stimulus appears to be steady (e.g., not intermittent) to an average human observer.

Figure 1:
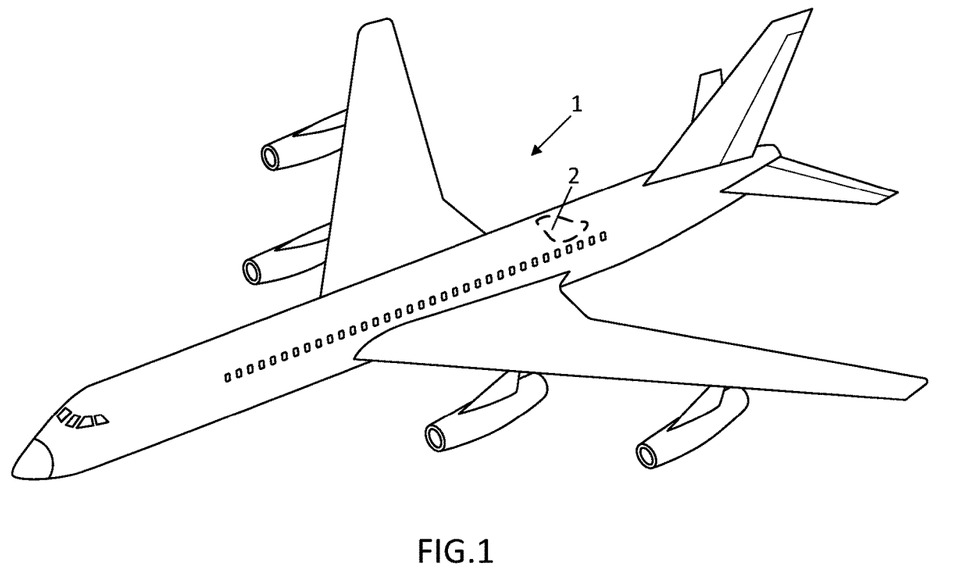
FIG. 1 illustrates an aircraft with a passenger cabin and including a system of sensory input control, in accordance with various embodiments.

With reference to FIG. 1, an aircraft 1 may have a passenger cabin with a sensory input control system 2 installed therein. Consequently, aircraft passengers may independently control their individual perceptions of cabin lighting, inflight entertainment options, whether windows appear open or closed, and the like.

Figure 2A:
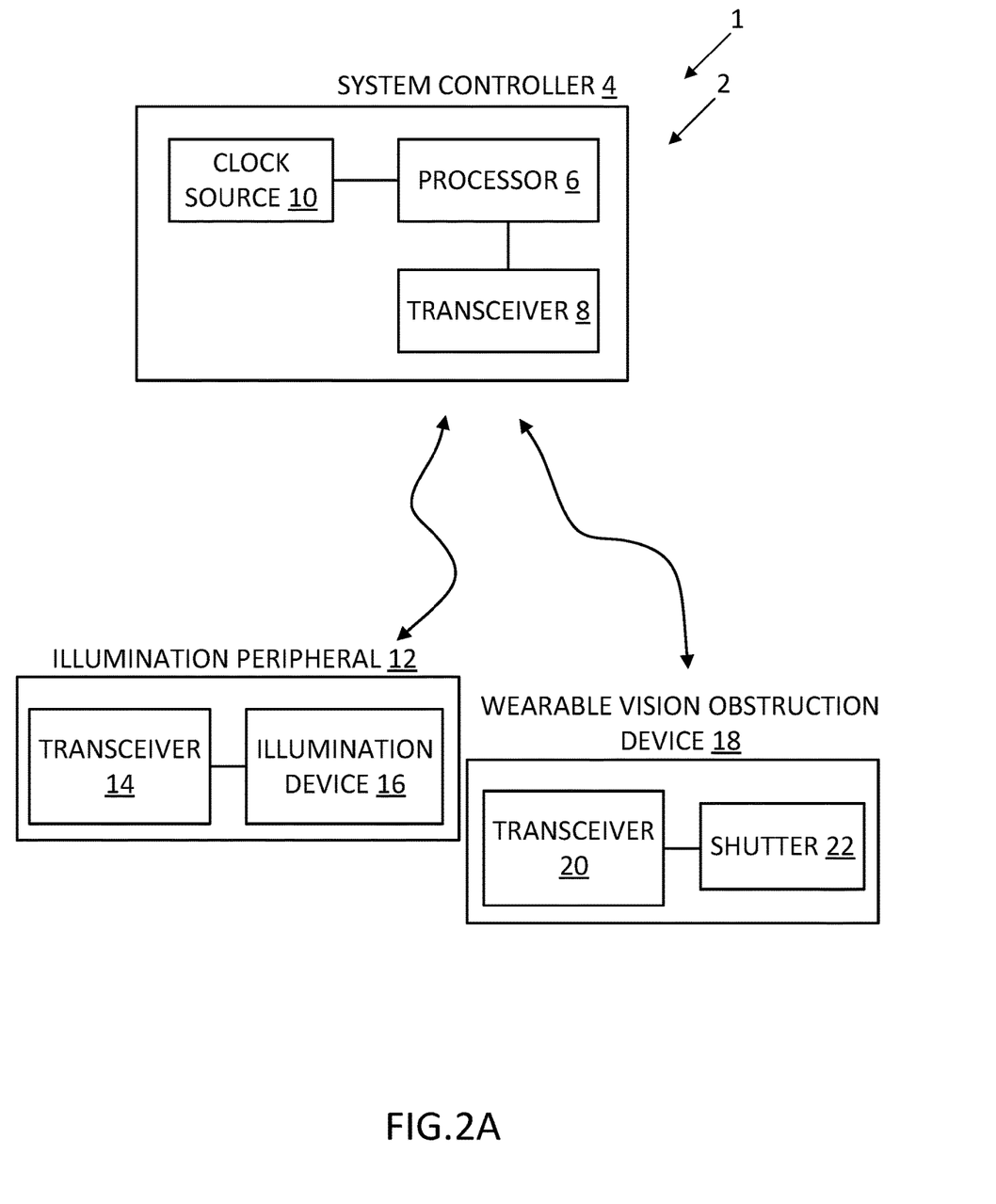
FIG. 2A illustrates an example system of sensory input control, in accordance with various embodiments.
Figure 2B:
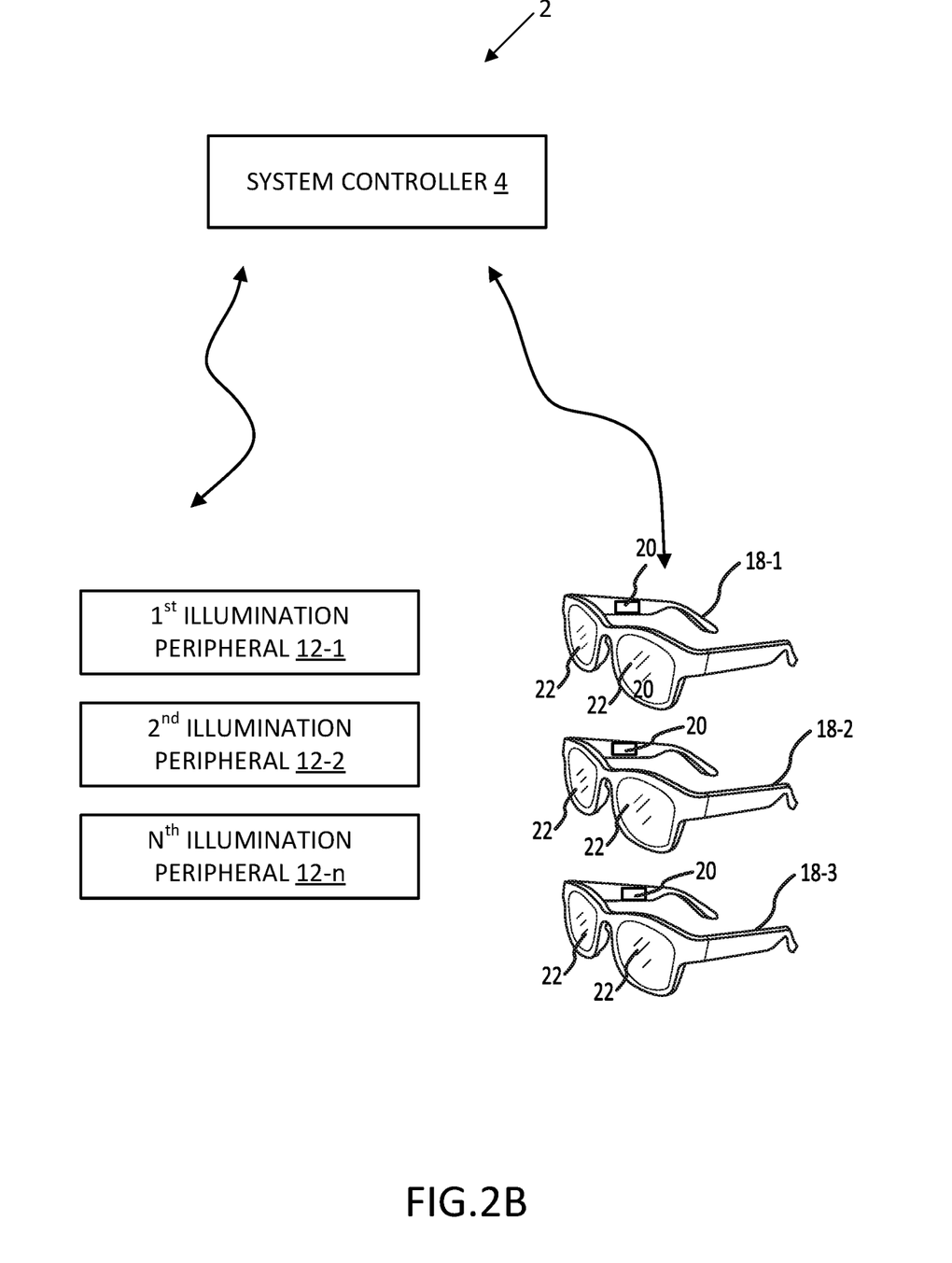
FIG. 2B illustrates further aspects of an example system of sensory input control, in accordance with various embodiments.

With reference to FIGS. 2A-B, the sensory input control system 2 of the aircraft 1 may include various components. For example, a system controller 4 may be provided.

The system controller 4 may provide a shared clock source to multiple illumination peripherals and multiple wearable vision obstruction devices having shutters. The multiple illumination peripherals may selectably turn on and off during different timeslots and the shutters of the multiple wearable vision obstruction devices may selectably occlude and un-occlude fields of view associated with vision of users during the different time slots. By modulating the illumination peripherals and the shutters, different users may perceive different sensory inputs in a shared environment. For instance, users may experience brighter or dimmer illumination, or may experience different types of illumination. One user may view a movie on an LCD screen while the LCD screen appears blank to another user. In this manner, a passenger cabin of an aircraft may provide individualized sensory experiences to different passengers sharing the aircraft cabin.

The system controller 4 may provide the clock source for synchronizing the frequency and timeslot of the various "on" or "off" periods of different sources of lighting and of different wearable vision obstruction devices. In this manner, the different users may perceive different lighting at different intensities. Each light source is associated with one or more timeslot. The wearable vision obstruction device of a user desiring to view a first light source may un-occlude the field of view during the appropriate time slot. Similarly, the wearable vision obstruction device of the user desiring to refrain from viewing a second light source may occlude the field of view during the appropriate time slot. By providing a shared clock source, different illumination sources and different wearable vision obstruction devices may operate so that some users perceive some illumination sources and other users perceive other illumination sources.

Thus, as introduced above, the sensory input control system 2 of the aircraft 1 may include an illumination peripheral 12. The illumination peripheral 12 may be in operative electronic communication with the system controller 4 to receive a shared clock provided by the clock source. In various instances, the illumination peripheral 12 may include an aircraft window with a shutter-device overlaid thereon, or may include an inflight entertainment system with an LCD screen having a backlight that can be turned on and off, or may include a cabin light, or a floor path light, or an off-axis ambient light, or any other illumination sources as desired.

The sensory input control system 2 of the aircraft may also include a wearable vision obstruction device 18. The wearable vision obstruction device 18 may be in operative electronic communication with the system controller 4 to receive the shared clock provided by the clock source. The wearable vision obstruction device 18 may comprise smart glasses. The wearable vision obstruction device 18 may comprise glasses with a shutter 22 adjacent to one or more lens. The shutters 22 may operate in concert to provide similar visual input to both eyes or may operate independently to provide different visual inputs to each eye. A shutter 22 is a panel that can be selectively made more opaque or less opaque (e.g., more transmissive or less transmissive to visible light). In various embodiments the shutters 22 are LCD shutters (liquid crystal shutter), though other shutter technologies are contemplated as well. Moreover, the wearable vision obstruction device 18 may have multiple such shutters or different types of shutters.

Having briefly introduced primary aspects of the sensory input control system 2, each component may have further aspects. For example, the system controller 4 may include a processor 6, a transceiver 8, and a clock source 10.

The clock source 10 may be a crystal oscillator, a tank circuit, a digital timing source, a third party timing source such as a GPS-provided timing source, or any other clock that may provide shared timing for other aspects of the system 2. The clock source 10 may be connected to the processor 6. The clock source 10 may provide a shared clock defining a first periodic duration of time and a second periodic duration of time. In various embodiments, the clock source 10 is an alternating current. For instance, a 60 Hz alternating current may provide a clock source 10 for a 60 Hz shared clock. Similarly, a 50 Hz alternating current may provide a clock source 10 for a 50 Hz shared clock. Yet furthermore, a 400 Hz alternating current may provide a clock source 10 for a 400 Hz shared clock. In various embodiments, a 400 Hz alternating current provides a clock source 10 which is divided to achieve a 50 Hz shared clock or a 60 Hz shared clock.

The processor 6 may structure and arrange data corresponding to a period, an instantaneous value, a frequency, or other characteristic of the shared clock and may communicate this data to a transceiver 8.

The transceiver 8 may transmit the data corresponding to the shared clock to other system aspects, such as an illumination peripheral 12 and/or a wearable vision obstruction device 18. In various embodiments, the transceiver 8 may be a wired transceiver, or a wireless transceiver. The transceiver 8 may be a radio transceiver. The transceiver 8 may be an optical transceiver and may comprise one or more illumination peripheral 12 modulating an optical beam. Thus, one may appreciate that the illumination peripherals may be implemented as a transceiver 8 to provide for data communication among the illumination peripherals 12, the wearable vision obstruction devices 18, and the system controller 4 to facilitate clock synchronization.

The illumination peripheral 12 may include further aspects as well. For example, the illumination peripheral 12 may include a transceiver 14. The transceiver may be a wired transceiver or a wireless transceiver. The transceiver 14 may be a radio transceiver. The transceiver 14 may be an optical transceiver. The transceiver 14 is any transceiver configured to receive signals transmitted by the transceiver 8 of the system controller 4 to facilitate clock synchronization. The illumination peripheral 12 may include an illumination device 16. The illumination device 16 may be connected to the transceiver 14 and may turn on or off. For instance, each illumination device 16 may have a specific time slot and may turn on only during its time slot and may turn off when not in its time slot. The illumination device may be an LED light, or other light source, or may be a backlight of an LCD screen such as an inflight entertainment screen. The illumination device may be an aircraft window having an electrically operable covering to occlude and un-occlude the window so that natural light is provided.

Finally, the wearable vision obstruction device 18 may include further aspects as well. For example, the wearable vision obstruction device 18 include a transceiver 20. The transceiver 20 may be a wired transceiver or a wireless transceiver. The transceiver 20 may be a radio transceiver. The transceiver 20 may be an optical transceiver. The transceiver 20 is any transceiver configured to receive signals transmitted by the transceiver 8 of the system controller 4 to facilitate clock synchronization. The wearable vision obstruction device 18 may include a shutter 22. The shutter 22 may be connected to the transceiver 20 and may open and close. For instance, each wearable vision obstruction device 18 may have a specific time slot and may open only during its time slot and may close when not in its time slot. The time slot may coincide with a timeslot of one or more illumination device 16 of one or more illumination peripheral 12.

In various embodiments, multiple illumination peripherals and multiple wearable vision obstruction devices are provided. Because multiple time slots are available and associated with different illumination peripherals and wearable vision obstruction devices, each individual wearing a wearable vision obstruction device may have a unique sensory experience and may perceive different subsets of the illumination peripherals at different intensities. For instance, a sensory input control system 2 may have a first illumination peripheral 12-1, a second illumination peripheral 12-2, and any number N of illumination peripherals, such as a N-th illumination peripheral 12-n. Similarly, the sensory input control system 2 may have a first wearable vision obstruction device 18-1, a second wearable vision obstruction device 18-2, and any number M of wearable vision obstruction devices, such as a M-th wearable vision obstruction device 18-m. A shared system controller 4 may be in operative electronic communication with the illumination peripherals and wearable vision obstruction devices and may have a clock source providing a shared clock to the illumination peripherals and wearable vision obstruction devices.

Thus, the system controller 4 with the clock source provides a shared clock defining first and second periodic durations of time. The first illumination peripheral 12-1 receives the shared clock, as does the second illumination peripheral 12-2. The first illumination peripheral 12-1 (and specifically, the illumination device of the first illumination peripheral) provides a first light to a shared space such as an aircraft passenger cabin. The first illumination peripheral 12-1 activates to provide the first light during at least a portion of the first periodic duration of time. Similarly, the first illumination peripheral 12-2 (and specifically, the illumination device of the second illumination peripheral) provides a second light to the shared space. The second illumination peripheral 12-2 activates to provide the second light during at least a portion of the second periodic duration of time.

The different wearable vision obstruction devices will also receive the shared clock. For instance, the first wearable vision obstruction device 18-1 and the second wearable vision obstruction device 18-2 both receive the shared clock. With the first and second illumination peripherals 12-1, 12-2 synchronized to the shared clock and also the first and second wearable vision obstruction devices 18-1, 18-2 synchronized to the shared clock, the on and off times of the different illumination devices and the open (un-occluded) and closed (occluded) times of the different wearable vision obstruction devices may be modulated so that different amounts of different illumination will be visible to different individuals.

For instance, the first wearable vision obstruction device 18-1 may have a first shutter 22 to selectably occlude a first field of view during at least a portion of the first periodic duration of time and to selectably un-occlude the first field of view during at least a portion of the second periodic duration of time, so that the first user perceives the second light and does not perceive at least a portion of the first light. Similarly, the second wearable vision obstruction device 18-2 also receives the shared clock and has a second shutter 22 to selectably occlude a second field of view during the second periodic duration of time and to selectably un-occlude the field of view during the first periodic duration of time, so that the second user perceives only the first light and not the second light. Even furthermore, the first shutter 22 can further selectably occludes the field of view during a further portion of the second periodic duration of time so that the user perceives only a portion of the second light. This allows customized dimming of light for individuals.

Figure 3:
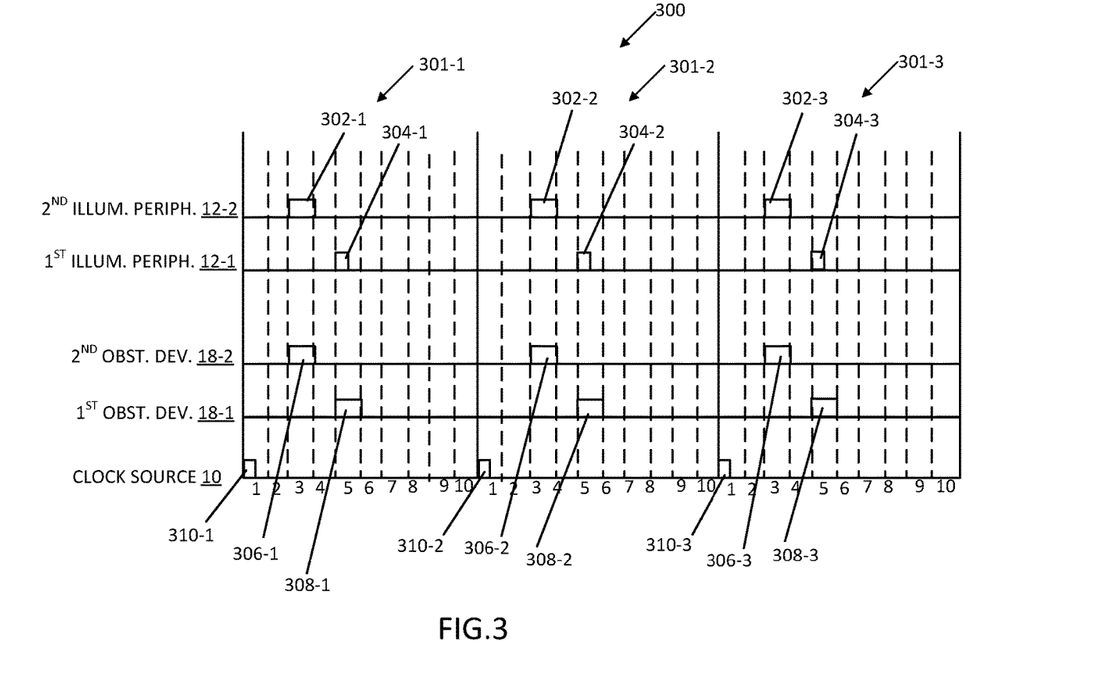
FIG. 3 illustrates an example timing diagram of operations performed by an example system of sensory input control, in accordance with various embodiments.

Direction attention now to FIG. 3, a timing diagram 300 of operations performed by an example system of sensory input control is provided. FIG. 3 depicts different timeslots numbered one through ten repeating periodically during a first clock period 301-1, a second clock period 301-2, and a third clock period 301-3. A clock source 10 provides a synchronization pulse at a beginning of each clock period, which the illumination peripherals and wearable vision obstruction devices receive and use to synchronize to the shared clock. For instance, a first synchronization pulse 310-1 marks a beginning of the first clock period 301-1, a second synchronization pulse 310-2 mark a beginning of the second clock period 301-2, and a third synchronization pulse 310-2 marks a beginning of the third clock period 301-3. Thus, a timeslot may be $\frac{1}{10}^{th}$ of a single clock cycle.

A first illumination peripheral 12-1 turns on in the fifth timeslot of the first clock period 301-1, as represented by a pulse 304-1. The first illumination peripheral 12-1 also turns on in the fifth timeslot of the second clock period 301-2, as represented by a pulse 304-2 and in the fifth timeslot of the third clock period 301-3, as represented by a pulse 304-3. Correspondingly a first wearable vision obstruction device 18-1 operates to un-occlude a field of vision during the fifth timeslot of the first clock period 301-1, second clock period 301-2, and third clock period 301-3 as reflected by pulses 308-1, 308-2, and 308-3. The first wearable vision obstruction device 18-1 otherwise operates to occlude the field of vision during the remaining timeslots of the clock periods. Consequently, the user perceives the illumination provided by the first illumination peripheral 12-1. For illustration, the first illumination peripheral 12-1 may be on for a different duration than the first wearable vision obstruction device. This is illustrated by a difference in pulse width among pulses 304-1, 304-2, and 304-3 and pulses 308-1, 308-2, 308-3. The pulse width of either set of pulses (those corresponding to the wearable vision obstruction devices or those corresponding to the illumination source) may be modulated to adjust perceived brightness of the illumination source.

The timing diagram 300 also shows operation of a second illumination peripheral 12-2 and a second wearable vision obstruction device 18-2 that are both associated with a different time slot. The second illumination peripheral 12-2 turns on in the third timeslot of the first clock period 301-1, as represented by a pulse 302-1. The second illumination peripheral 12-2 also turns on in the third timeslot of the second clock period 301-2, as represented by a pulse 302-2 and in the third timeslot of the third clock period 301-3, as represented by a pulse 302-3. Correspondingly a second wearable vision obstruction device 18-2 operates to un-occlude a field of vision during the third timeslot of the first clock period 301-1, second clock period 301-2, and third clock period 301-3 as reflected by pulses 306-1, 306-2, and 306-3. The second wearable vision obstruction device 18-2 otherwise operates to occlude a field of vision during the remaining timeslots of the clock periods. Consequently, the user perceives the illumination provided by the second illumination peripheral 12-2. For illustration, the second illumination peripheral 12-2 may be on for a same duration as the second wearable vision obstruction device. This is illustrated by a similarity in pulse width among pulses 302-1, 302-2, and 302-3 and pulses 306-1, 306-2, 306-3. The pulse width of either set of pulses (those corresponding to the wearable vision obstruction devices or those corresponding to the illumination source) may be modulated to adjust perceived brightness of the illumination source, but in this illustration the pulse widths are similar so that the illumination source is perceived at full intensity by the user of the second wearable vision occlusion device.

Figure 4:
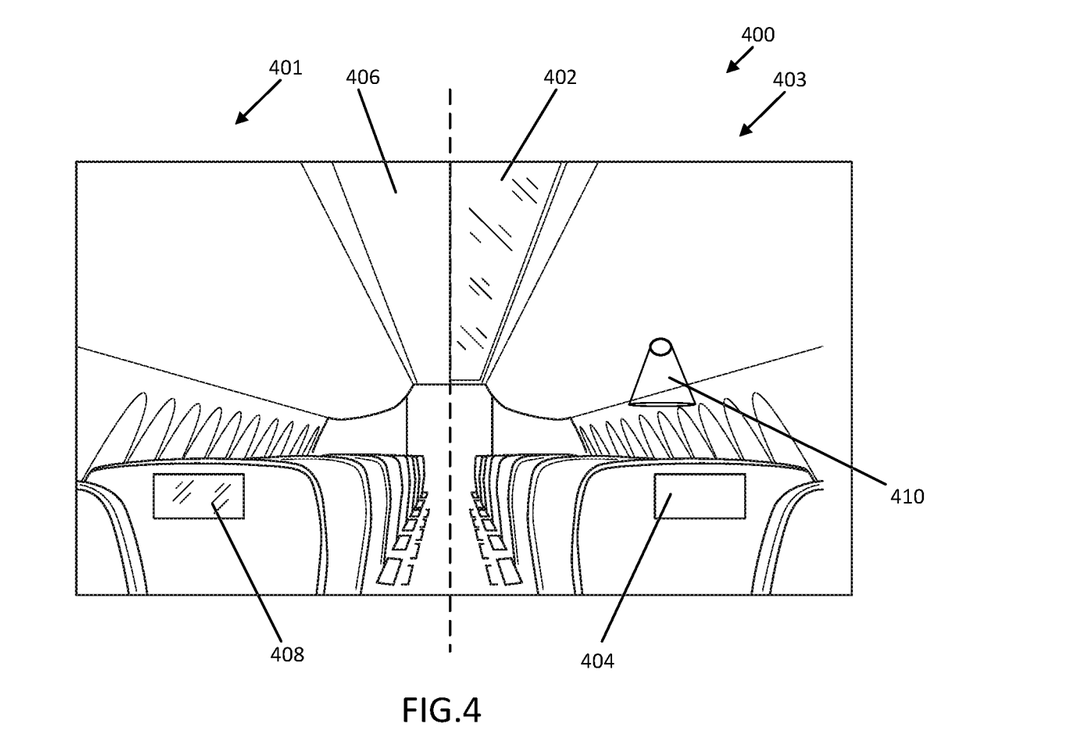
FIG. 4 illustrates an interior view of a passenger cabin of an aircraft during operation of the system of sensory input control, in accordance with various embodiments.

Various features of an aircraft cabin environment may be customized by the sensory input control system 2. With reference to FIG. 4, a few example uses are depicted. For instance, an aircraft cabin environment 400 may be perceived differently by a first user wearing a wearable vision occlusion device and a second user wearing a wearable vision occlusion device. The first user may perceive a first environment 401 and the second user may perceive a second environment 403. The first user may perceive an inflight entertainment system screen 408 displaying a movie and a constant cabin illumination 406. In contrast, a second user may perceive an inflight entertainment system screen 404 that is turned off and may perceive a reading light 410 that is turned on. The second user may perceive projected images 402 on interior surfaces of the aircraft cabin.

Figure 5:
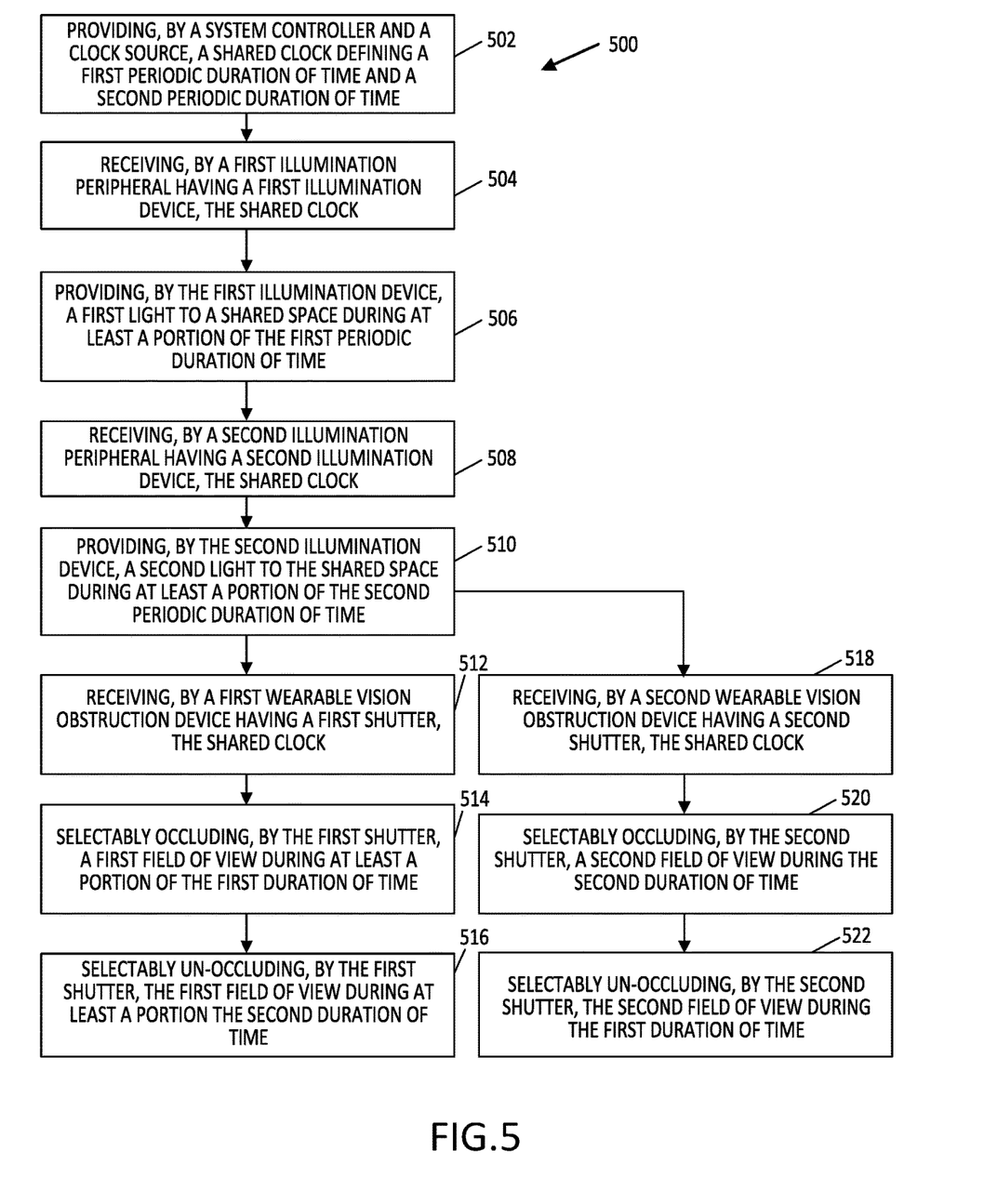
FIG. 5 illustrates an example method of sensory input control performable by the system of sensory input control, in accordance with various embodiments.

With renewed reference now to FIGS. 1-3, and additional reference to FIG. 5, a method of sensory input control may be implemented by the system of sensory input control 2. In one example, the method 500 may include one or more aspects which may be performed in sequence or in parallel. For instance, a system controller 4 having a clock source 10 may provide a shared clock defining a first periodic duration of time and a second periodic duration of time (block 502). A first illumination peripheral 12 having a first illumination device 16 receives the shared clock (block 504). The first illumination device 16 provides a first light to a shared space during at least a portion of the first periodic duration of time (block 506). A second illumination peripheral 12 having a second illumination device 16 also receives the shared clock (block 508). The second illumination device 16 provides a second light to the shared space during at least a portion of the second periodic duration of time (block 510). A first wearable vision obstruction device 18 having a first shutter 22 receives the shared clock (block 512). The first shutter 22 selectably occludes a first field of view during at least a portion of the first periodic duration of time (block 514). The first shutter 22 selectably un-occludes the first field of view during at least a portion the second periodic duration of time (block 516). The first user perceives the second light and does not perceive at least a portion of the first light.

In parallel, a second wearable vision obstruction device 18 having a second shutter 22 may also receive the shared clock (block 518). The second shutter may selectably occlude a second field of view during the second periodic duration of time (block 520). The second shutter may also selectably un-occlude the second field of view during the first periodic duration of time (block 522). The second user perceives only the first light and not the second light.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A sensory input control system comprising:
a system controller comprising a clock source to provide a shared clock defining a first periodic duration of time and a second periodic duration of time;
a first illumination peripheral configured to receive the shared clock and comprising a first illumination device providing a first light to a shared space during at least a portion of the first periodic duration of time;
a second illumination peripheral configured to receive the shared clock and comprising a second illumination device providing a second light to the shared space during at least a portion of the second periodic duration of time; and
a first wearable vision obstruction device configured to receive the shared clock and comprising a first shutter to selectably occlude a first field of view based on pulse width modulation during at least a portion of the first periodic duration of time, such that a first user perceives the first light as turned off and perceives the second light as turned off, and to selectably un-occlude the first field of view during at least a portion the second periodic duration of time, so that a first user perceives the second light as turned on and does not perceive at least a portion of the first light.

2. The sensory input control system according to claim 1, further comprising a second wearable vision obstruction device configured to receive the shared clock and comprising a second shutter to selectably occlude a second field of view during the second periodic duration of time, such that a second user perceives the first light as turned off and perceives the second light as turned off, and to selectably un-occlude the second field of view during the first periodic duration of time, so that a second user perceives the first light as turned on and perceives the second light as turned off.

3. The sensory input control system according to claim 1, wherein the shared space is an aircraft passenger cabin.

4. The sensory input control system according to claim 3, wherein the first illumination device is an LCD screen configured to play videos and the second illumination device is an overhead cabin light.

5. The sensory input control system according to claim 1, wherein the first shutter further selectably occludes the first field of view during a further portion of the second periodic duration of time so that the first user perceives only a portion of the second light, such that the first user perceives the second light as turned on at a lesser brightness level as compared to a un-occluded brightness level of the second light.

6. The sensory input control system of claim 1, wherein the system controller comprises a wireless transceiver transmitting the shared clock and wherein the first illumination peripheral comprises a wireless transceiver to receive the shared clock.

7. The sensory input control system of claim 1 wherein the first wearable vision obstruction device comprises wireless smart glasses.

8. The sensory input control system of claim 1, wherein the first shutter of the first wearable vision obstruction device comprises an LCD shutter.

9. The sensory input control system of claim 1, wherein the shared clock comprises a 60 Hz clock and wherein the first periodic duration of time comprises a timeslot of $1/10^{th}$ of a single 60 Hz clock cycle.

10. A sensory input control system comprising:
a system controller comprising a clock source to provide a shared clock defining a first periodic duration of time and a second periodic duration of time; and
a transceiver configured to receive the shared clock and configured to direct an overhead light of an aircraft passenger cabin to turn on to provide a first light to the aircraft passenger cabin during at least a portion of the first periodic duration of time and to turn off to not provide the first light to the aircraft passenger cabin during at least a portion of the second periodic duration of time,
wherein the system controller is further configured to provide the shared clock to a first wearable vision obstruction device worn by a passenger to selectably occlude a field of view during at least a portion of the first periodic duration of time during which the overhead light is providing the first light to the aircraft passenger cabin, and
wherein the overhead light of the aircraft passenger cabin is at least one of a cabin light, a reading light, or an image projected on an interior surface of the aircraft cabin.

11. The sensory input control system according to claim 10, wherein the transceiver is configured to direct a backlight of a seatback video screen of the aircraft passenger cabin to turn off during at least a portion of the first periodic duration of time and to turn on during at least a portion of the second periodic duration of time.

12. The sensory input control system of claim 10, further comprising the first wearable vision obstruction device, wherein the first wearable vision obstruction device comprises a smart glasses with an LCD shutter.

13. A method of sensory input control comprising:
providing, by a system controller and a clock source, a shared clock defining a first periodic duration of time and a second periodic duration of time;
receiving, by a first illumination peripheral having a first illumination device, the shared clock;
providing, by the first illumination device, a first light to a shared space of an aircraft cabin during at least a portion of the first periodic duration of time;
receiving, by a second illumination peripheral having a second illumination device, the shared clock;
providing, by the second illumination device, a second light from at least one of a cabin light, a reading light, or an image projected on an interior surface of the aircraft cabin to the shared space of the aircraft cabin during at least a portion of the second periodic duration of time;
receiving, by a first wearable vision obstruction device having a first shutter, the shared clock;
selectably occluding, by the first shutter, a first field of view of a first user during at least a portion of the first periodic duration of time; and
selectably un-occluding, by the first shutter, the first field of view of the first user during at least a portion of the second periodic duration of time.

14. The method of sensory input control according to claim 13, further comprising:
receiving, by a second wearable vision obstruction device having a second shutter, the shared clock;
selectably occluding, by the second shutter, a second field of view of a second user during the second periodic duration of time; and selectably un-occluding, by the second shutter, the second field of view of the second user during the first periodic duration of time.

15. The method of sensory input control according to claim 14, wherein the first illumination device is an LCD screen configured to play videos.

16. The method of sensory input control according to claim 13, wherein the system controller comprises a wireless transceiver transmitting the shared clock and wherein the first illumination peripheral comprises a wireless transceiver to receive the shared clock.

17. The method of sensory input control according to claim 13, wherein the first wearable vision obstruction device comprises wireless smart glasses.

18. The method of sensory input control according to claim 13, wherein the first shutter of the first wearable vision obstruction device comprises an LCD shutter.

19. The method of sensory input control according to claim 13, wherein the shared clock comprises a 60 Hz clock and wherein the first periodic duration of time comprises a timeslot of $1/10^{th}$ of a single 60 Hz clock cycle.

20. The method of sensory input control according to claim 14, wherein the occluding by the first shutter and by the second shutter is pulse width modulated and synchronized such that the first user and the second user perceive the first light at different brightness levels.

* * * * *